US012762956B2

(12) United States Patent
Kashiwakura et al.

(10) Patent No.: US 12,762,956 B2
(45) Date of Patent: Oct. 13, 2026

(54) ROADSIDE DEVICE

(71) Applicant: TOYOTA JIDOSHA KABUSHIKI KAISHA, Toyota (JP)

(72) Inventors: Toshiki Kashiwakura, Tokyo (JP); Chihiro Inaba, Tokyo (JP); Shoi Suzuki, Tokyo (JP); Tsuyoshi Okada, Nagoya (JP); Yasuhiro Kobatake, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 8 days.

(21) Appl. No.: 18/956,031

(22) Filed: Nov. 22, 2024

(65) Prior Publication Data

US 2025/0265931 A1 Aug. 21, 2025

(30) Foreign Application Priority Data

Feb. 19, 2024 (JP) ................................ 2024-023073

(51) Int. Cl.
*G08G 1/16* (2006.01)
*G08G 1/01* (2006.01)

(52) U.S. Cl.
CPC ........... *G08G 1/166* (2013.01); *G08G 1/0116* (2013.01); *G08G 1/0141* (2013.01); *G08G 1/0145* (2013.01); *G08G 1/164* (2013.01)

(58) Field of Classification Search
CPC .... G08G 1/166; G08G 1/0116; G08G 1/0141; G08G 1/0145; G08G 1/164; G08G 1/005; G08G 1/012; G08G 1/0125; G08G 1/0137; G08G 1/048; G08G 1/052
See application file for complete search history.

(56) References Cited

U.S. PATENT DOCUMENTS

| | | | | |
|---|---|---|---|---|
| 10,261,513 | B2 * | 4/2019 | Reiley | B60Q 1/26 |
| 2009/0256723 | A1 * | 10/2009 | Peddie | G08G 1/096783<br>340/907 |
| 2014/0062685 | A1 * | 3/2014 | Tamatsu | G08G 1/005<br>340/425.5 |
| 2019/0344706 | A1 * | 11/2019 | Morimura | B60Q 1/543 |
| 2021/0217304 | A1 * | 7/2021 | Shino | G08G 1/123 |
| 2022/0284815 | A1 * | 9/2022 | Hwang | H04W 4/40 |
| 2024/0359683 | A1 * | 10/2024 | Perez Barrera | G06V 20/58 |

FOREIGN PATENT DOCUMENTS

| | | |
|---|---|---|
| JP | 2023-050629 A | 4/2023 |

* cited by examiner

*Primary Examiner* — Faris S Almatrahi
*Assistant Examiner* — Dana F Artimez
(74) *Attorney, Agent, or Firm* — SoraIP, Inc.

(57) ABSTRACT

A roadside device provided at a position where a pedestrian crosses a road, wherein the control unit acquires information including a plurality of items related to approach of an autonomous vehicle approaching the position and information indicating whether at least one following vehicle of the autonomous vehicle exists, notifies the pedestrian of the entirety of the plurality of items when the following vehicle does not exist, and notifies the pedestrian of a part of the plurality of items when at least one following vehicle exists.

9 Claims, 5 Drawing Sheets

ROADSIDE DEVICE

CROSS-REFERENCE TO RELATED APPLICATION

This application claims priority to Japanese Patent Application No. 2024-023073 filed on Feb. 19, 2024, incorporated herein by reference in its entirety.

BACKGROUND

1. Technical Field

The present disclosure relates to a roadside device.

2. Description of Related Art

Conventionally, there has been a technique of providing information relating to the behavior of an autonomous vehicle. For example, Japanese Unexamined Patent Application Publication No. 2023-050629 (JP 2023-050629 A) indicates that a vehicle other than an autonomous vehicle or a pedestrian is informed of whether the vehicle or the pedestrian is allowed to pass or a warning according to the behavior of the autonomous vehicle that is scheduled to pass through a predetermined traffic area.

SUMMARY

There is room for improvement in a technique of notifying a pedestrian of information relating to the approach of an autonomous vehicle.

An aspect of the present disclosure provides a roadside device including a control unit and provided at a position where a pedestrian crosses a road, in which the control unit is configured to:

acquire approach information including a plurality of items relating to approach of an autonomous vehicle approaching the position and following vehicle information indicating whether there is at least one vehicle following the autonomous vehicle; and notify the pedestrian of all the items when the following vehicle is not present, and notify the pedestrian of a part of the items when there is at least one following vehicle.

According to the present disclosure, it is possible to improve a technique of notifying a pedestrian of information relating to the approach of an autonomous vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
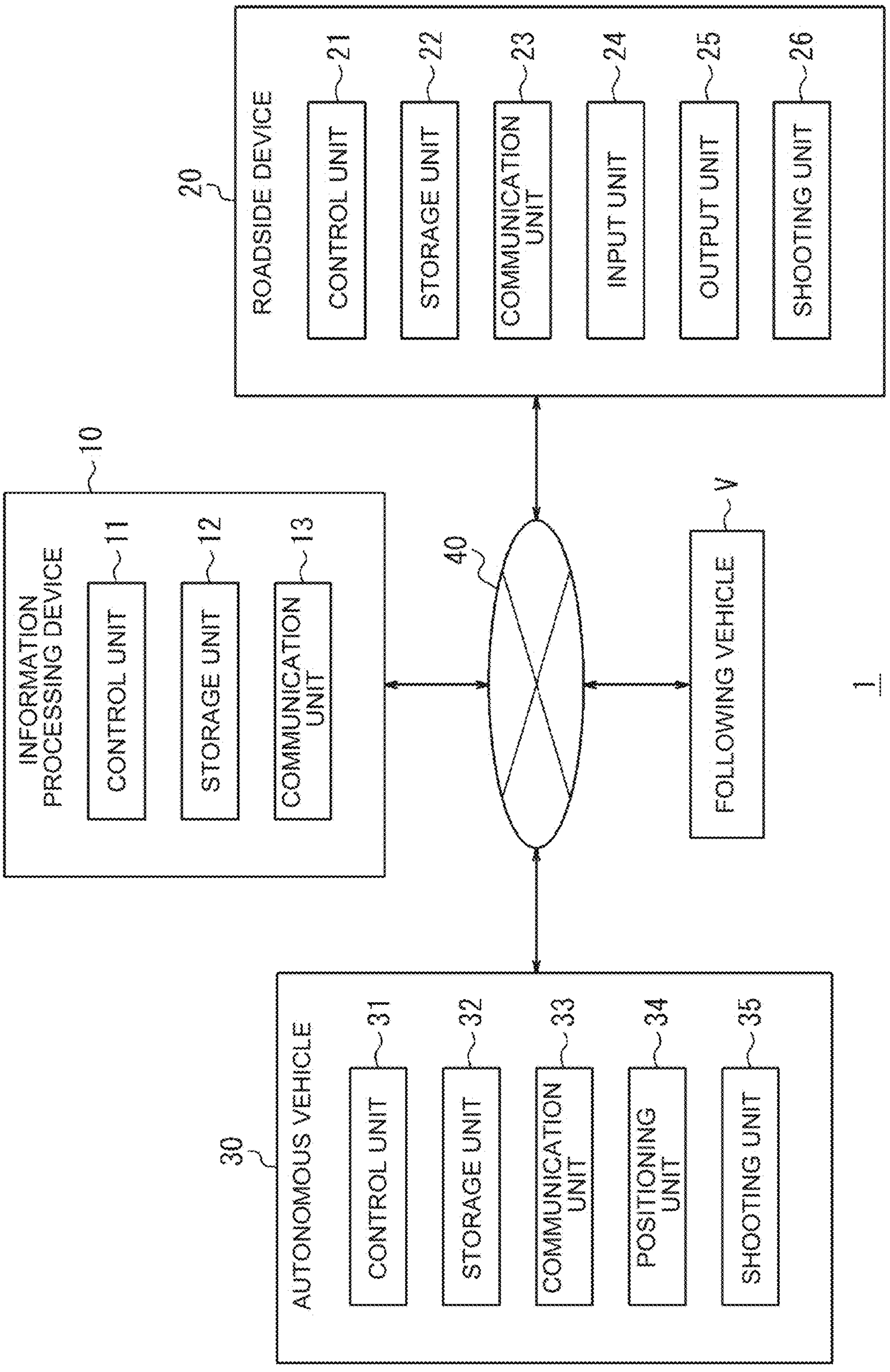
FIG. 1 is a diagram illustrating a schematic configuration of a system according to the present embodiment.

Hereinafter, an embodiment of the present disclosure will be described below with reference to the drawings. In the drawings, the same or corresponding parts are denoted by the same reference numerals. In the description of the present embodiment, description of the same or corresponding components will be appropriately omitted or simplified.

A configuration of the system 1 according to the present embodiment will be described with reference to FIG. 1. The system 1 includes an information processing device 10, a roadside device 20, an autonomous vehicle 30, and a following vehicle V of the autonomous vehicle 30. The information processing device 10 can communicate with the roadside device 20, the autonomous vehicle 30, and the following vehicle V via the network 40. In FIG. 1, one following vehicle V is shown, but the number of following vehicles V is not limited to this.

The information processing device 10 is a computer installed in a facility such as a data center. The information processing device 10 is, for example, a server belonging to a cloud computing system or another computing system.

The roadside device 20 notifies the pedestrian who intends to cross the road of the presence of the autonomous vehicle 30 approaching the roadside device 20 through the road. The roadside device 20 may also notify the autonomous vehicle 30 of the presence of a pedestrian. The roadside device 20 is provided at a position where the pedestrian crosses the road. The position specifically includes a position within a predetermined range from the start position of the crosswalk. The roadside device 20 may be installed near the boundary between the road and the sidewalk. In the present embodiment, the road is a road in which the passage of the vehicle is prioritized rather than the pedestrian.

The autonomous vehicle 30 and the following vehicle V are any type of vehicle, such as a gasoline-powered vehicle, a diesel-powered vehicle, a BEV (Battery Electric Vehicle), a HEV (Hybrid Electric Vehicle), a PHEV (Plug-in Hybrid Electric Vehicle), or a FCEV (Fuel Cell Electric Vehicle). In addition to the autonomous vehicle 30, the following vehicle V may also be movable by autonomous driving. Automated driving includes, for example, Levels 1 to 5 defined by the Society of Automotive Engineers (SAE). However, automated driving is not limited to the above, and may be arbitrarily defined. When traveling on the road according to the present embodiment, when the following vehicle V is not present, the autonomous vehicle 30 pauses and waits for the pedestrian to complete crossing before passing. When the following vehicle V is present, the autonomous vehicle 30 may pass in front of the pedestrian without being temporarily stopped so as not to obstruct the traffic flow.

The network 40 includes the Internet, at least one WAN, at least one MAN, or any combination thereof. WAN is an abbreviation for wide area network. MAN is an abbreviation for metropolitan area network. The network 40 may include at least one wireless network, at least one optical network, or any combination thereof. The wireless network is, for example, an ad hoc network, a cellular network, a wireless LAN, a satellite communication network, or a terrestrial microwave network. The term "LAN" is an abbreviation for "local area network".

First, the outline of the present embodiment will be described, and the details will be described later. The roadside device 20 is provided at a position where the pedestrian crosses the road. The roadside device 20 acquires approach information including a plurality of items related to the approach of the autonomous vehicle 30 approaching the position, and follow-up vehicle information indicating whether at least one following vehicle V of the autonomous vehicle 30 exists. The roadside device 20 notifies the pedestrian of the entirety of the plurality of items when the following vehicle V does not exist, and notifies the pedestrian of a part of the plurality of items when there is at least one following vehicle V.

Some items included in the approach information according to the present embodiment may be inaccurate. If the following vehicle V does not exist, there is no particular disadvantage to the pedestrian even if an item that may be inaccurate is notified. For example, even if the item of "remaining distance" included in the approach information becomes inaccurate, since the autonomous vehicle 30 is temporarily stopped, there is no danger to the pedestrian even if the item is notified. Also, even items that may be inaccurate may benefit pedestrians by being notified. For example, a pedestrian who recognizes that walking speed is slow, such as an injured person or an elderly person, can make a flexible judgment such that the pedestrian passes through the autonomous vehicle 30 first and then slowly traverses, when the notified "remaining distance" is short to some extent. Therefore, in the present embodiment, when the following vehicle V of the autonomous vehicle 30 does not exist, the whole of the plurality of items included in the approach information is notified. When the following vehicle V is present, if an item that may be inaccurate is notified, there is a possibility that the pedestrian makes an erroneous determination. For example, if the notified item of "remaining distance" is longer than the actual value, the pedestrian may misunderstand that there is a time margin before the autonomous vehicle 30 comes and start crossing, and as a result, the autonomous vehicle 30 may stop suddenly. According to the present embodiment, since only some items of the approach information are notified when the following vehicle V is present, the probability that the pedestrian makes an erroneous determination is reduced, and consequently, the safety and the smoothness of the traffic are improved. Therefore, it is possible to improve a technique of notifying a pedestrian of information related to the approach of the autonomous vehicle.

A configuration of the information processing device 10 according to the present embodiment will be described with reference to FIG. 1. The information processing device 10 includes a control unit 11, a storage unit 12, and a communication unit 13.

The control unit 11 includes at least one processor, at least one programmable circuit, at least one dedicated circuit, or any combination thereof. The processor is a general-purpose processor such as a CPU or a GPU, or a dedicated processor specialized for a specific process. The term "CPU" is an abbreviation for "central processing unit". The term "GPU" is an abbreviation for "graphics processing unit". The programmable circuit is, for example, an FPGA. The term "FPGA" is an abbreviation for "field-programmable gate array". The dedicated circuit is, for example, an ASIC. The term "ASIC" is an abbreviation for "application specific integrated circuit". The control unit 11 executes processing related to the operation of the information processing device 10 while controlling each unit of the information processing device 10.

The storage unit 12 includes at least one semiconductor memory, at least one magnetic memory, at least one optical memory, or any combination thereof. The semiconductor memory is, for example, a RAM, a ROM, or a flash memory. The term "RAM" is an abbreviation for "random access memory". The term "ROM" is an abbreviation for "read-only memory". The RAM is, for example, an SRAM or a DRAM. The term "SRAM" is an abbreviation for "static random access memory". The term "DRAM" is an abbreviation for "dynamic random access memory". The ROM is, for example, an EEPROM. The term "EEPROM" is an abbreviation for "electrically erasable programmable read-only memory". The flash memory is, for example, an SSD. "SSD" is an abbreviation for solid-state drive. The magnetic memory is, for example, an HDD. "HDD" is an abbreviation for hard disk drive. The storage unit 12 may function as, for example, a main storage device, an auxiliary storage device, or a cache memory. The storage unit 12 stores information used for the operation of the information processing device 10 and information obtained by the operation of the information processing device 10.

The communication unit 13 includes at least one communication module. The communication module is, for example, a module compatible with a wired LAN communication standard such as Ethernet (registered trademark) or a wireless LAN communication standard such as IEEE802.11. "IEEE" is an abbreviation for Institute of Electrical and Electronics Engineers. The communication unit 13 communicates with devices other than the information processing device 10. The communication unit 13 receives information used for the operation of the information processing device 10 and transmits information obtained by the operation of the information processing device 10.

A configuration of the roadside device 20 according to the present embodiment will be described with reference to FIG. 1. The roadside device 20 includes a control unit 21, a storage unit 22, a communication unit 23, an input unit 24, an output unit 25, and a shooting unit 26. The hardware configurations of the control unit 21 and the storage unit 22 of the roadside device 20 may be the same as the hardware configurations of the control unit 11 and the storage unit 12 of the information processing device 10, respectively. The description here is omitted.

The communication unit 23 includes at least one communication interface. The communication interface is, for example, an interface compatible with mobile communication standards such as LTE, the 4G standard, or the 5G standard, an interface compatible with short-range wireless communication standard such as Bluetooth (registered trademark), or a LAN interface. The term "LTE" is an abbreviation for "long term evolution". The term "4G" is an abbreviation for "fourth generation". The term "5G" is an abbreviation for "fifth generation". The communication unit 23 receives information used for the operation of the roadside device 20 and transmits information obtained by the operation of the roadside device 20.

The input unit 24 includes at least one input interface. The input interface is, for example, a physical key, a capacitive key, a pointing device, a touch screen integrated with a display, or a microphone. The input unit 24 receives an operation of inputting data used for the operation of the roadside device 20. Instead of being provided in the roadside device 20, the input unit 24 may be connected to the roadside device 20 as an external input device. As a connection method, for example, any method such as a universal serial bus (USB), a high-definition multimedia interface (HDMI) (registered trademark), or Bluetooth (registered trademark) can be used. The term "USB" is an abbreviation for "universal serial bus". The term "HDMI (registered trademark)" is an abbreviation for "high-definition multimedia interface".

The output unit 25 includes at least one output interface. The output interface is, for example, a display or a speaker. The display is, for example, an LCD or an organic EL display. LCD is an abbreviation for liquid crystal display. The term "EL" is an abbreviation for "electroluminescence". The display may be a LED display. The term "LED" is an abbreviation for "light emitting diode". The output unit 25 outputs data obtained by the operation of the roadside device 20. Instead of being provided in the roadside device 20, the output unit 25 may be connected to the roadside device 20 as an external output device. As a connection method, for example, any method such as a universal serial bus (USB), a high-definition multimedia interface (HDMI) (registered trademark), or Bluetooth (registered trademark) can be used. The output unit 25 may include a light-emitting device such as a LED light.

The shooting unit 26 is a camera that photographs the periphery of the roadside device 20. The camera may include a lens capable of capturing 360 degrees. The shooting unit 26 can output the captured image to the control unit 21.

A configuration of the autonomous vehicle 30 according to the present embodiment will be described with reference to FIG. 1. The autonomous vehicle 30 includes a control unit 31, a storage unit 32, a communication unit 33, a positioning unit 34, and a shooting unit 35. The hardware configuration of the storage unit 32 of the autonomous vehicle 30 may be the same as the hardware configuration of the storage unit 12 of the information processing device 10. The description here is omitted. The hardware configuration of the communication unit 33 of the autonomous vehicle 30 may be the same as the hardware configuration of the communication unit 23 of the roadside device 20. The description here is omitted.

The control unit 31 includes at least one processor, at least one programmable circuit, at least one dedicated circuit, at least one ECU, or any combination thereof. ECU is an abbreviation for electronic control unit. The processor is a general-purpose processor such as a CPU or a GPU, or a dedicated processor specialized for a specific process. The programmable circuit is, for example, an FPGA. The dedicated circuit is, for example, an ASIC. The control unit 31 executes processing related to the operation of the autonomous vehicle 30 while controlling each unit of the autonomous vehicle 30.

The positioning unit 34 includes at least one GNSS receiver. GNSS is an abbreviation for global navigation satellite system. GNSS is, for example, GPS, QZSS, BeiDou, GLONASS, or Galileo. GPS is an abbreviation for Global Positioning System. The "QZSS" is an abbreviation for quasi-zenith satellite system. A satellite for the QZSS is referred to as a quasi-zenith satellite. GLONASS is an abbreviation for Global Navigation Satellite System. The positioning unit 34 measures the position of the autonomous vehicle 30.

The shooting unit 35 is a camera that photographs the surroundings of the autonomous vehicle 30. The shooting unit 35 can output the acquired image to the control unit 31. The shooting unit 35 includes a drive recorder.

A control unit having a hardware configuration similar to that of the autonomous vehicle 30, a storage unit, a communication unit, and a positioning unit may be provided with a following vehicle V. The autonomous vehicle 30 and the following vehicle V may be capable of transmitting position information indicating the position of the subject vehicle to the information processing device 10.

The functions of the information processing device 10, the roadside device 20, or the autonomous vehicle 30 are realized by executing the program according to the present embodiment by a processor serving as the control unit 11, the control unit 21, or the control unit 31. That is, the functions of the information processing device 10, the roadside device 20, or the autonomous vehicle 30 are realized by software. The program causes the computer to execute the operations of the information processing device 10, the roadside device 20, or the autonomous vehicle 30, thereby causing the computer to function as the information processing device 10, the roadside device 20, or the autonomous vehicle 30. That is, the computer functions as the information processing device 10, the roadside device 20, or the autonomous vehicle 30 by executing the operations of the information processing device 10, the roadside device 20, or the autonomous vehicle 30 in accordance with the program.

The program can be stored in a non-transitory computer-readable medium. The non-transitory computer-readable medium is, for example, a flash memory, a magnetic recording device, an optical disc, an opto-magnetic recording medium, or a ROM. The program is distributed, for example, by selling, transferring, or lending a portable medium such as a SD card, DVD, or CD-ROM storing the program. The term "SD" is an abbreviation for "secure digital". The term "DVD" is an abbreviation for "digital versatile disc". The term "CD-ROM" is an abbreviation for "compact disc read-only memory". The program may be stored in the storage of the server and transferred from the server to other computers to distribute the program. The program may be provided as a program product.

The computer temporarily stores the program stored in the portable medium or the program transferred from the server in the main storage device, for example. The computer then causes the processor to read the program stored in the main storage device, and causes the processor to execute processes in accordance with the read program. The computer may read the program directly from the portable medium and execute processes in accordance with the program. The computer may execute the processes in accordance with the received program each time the program is transferred from the server to the computer. The processes may be executed by a so-called ASP service that realizes the function only by execution instruction and result acquisition without transferring the program from the server to the computer. The term "ASP" is an abbreviation for "application service provider". The program includes information that is used for processing by electronic computers and equivalent to a program. For example, data that is not a direct command to a computer but has the property of defining the processing of the computer corresponds to the "data equivalent to a program".

Part or all of the functions of the information processing device 10, the roadside device 20, or the autonomous vehicle 30 may be realized by a programmable circuit or a dedicated circuit as the control unit 11, the control unit 21, or the control unit 31. That is, some or all of the functions of the information processing device 10, the roadside device 20, or the autonomous vehicle 30 may be realized by hardware.

The operation of the system 1 according to the present embodiment will be described with reference to FIGS. 2 and 3. Among the operations illustrated in FIG. 2, the operation of the roadside device 20 corresponds to the method according to the present embodiment. In the following description, communication between the information processing device 10 and the external apparatus is performed via the communication unit 13 and the network 40. In the following description, communication between the roadside device 20 and the external device is performed via the communication unit 23 and the network 40. In the following description, communication between the autonomous vehicle 30 and the external device is performed via the communication unit 33 and the network 40.

Figure 2:
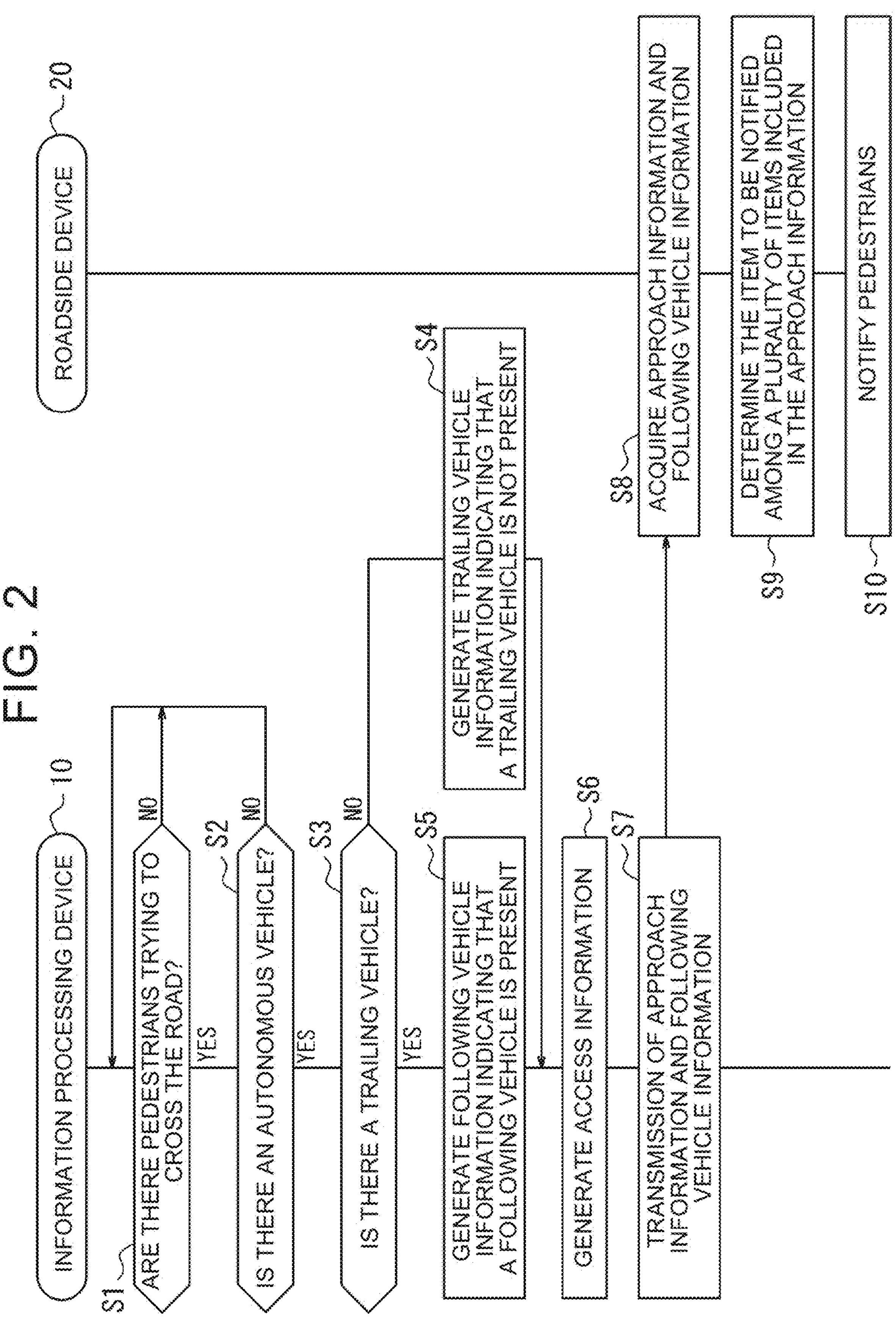
FIG. 2 is a flowchart showing an operation of the system according to the present embodiment.

In S1 of FIG. 2, the control unit 11 of the information processing device 10 determines whether or not there is a pedestrian who intends to cross the street. When there is no pedestrian who intends to cross the street (S1: NO), the operation of the control unit 11 returns to the start. When there is a pedestrian who intends to cross the street (S1: YES), the operation of the control unit 11 proceeds to S2.

Any method may be employed to determine whether there is a pedestrian attempting to cross a road. For example, the control unit 11 may receive and acquire an image captured by the shooting unit 26 of the roadside device 20 from the roadside device 20, analyze the image using an arbitrary image analysis technique, and determine whether or not a pedestrian who intends to cross a road is reflected in the image. The control unit 11 may acquire the image by receiving the image from an outdoor camera that captures an image of a certain position of the roadside device 20. The control unit 11 may communicate with the terminal device used by the pedestrian, acquire terminal position information indicating the position of the terminal device, and determine whether there is a pedestrian who is going to cross the road based on the terminal position information.

In S2, the control unit 11 determines whether there is an autonomous vehicle 30 that is coming to a position where the pedestrian crosses the road. When the autonomous vehicles 30 do not exist (S2: NO), the operation of the control unit 11 returns to S1. When the autonomous vehicles 30 exist (S2: YES), the operation of the control unit 11 proceeds to S3.

Any method may be employed to determine whether there is an incoming autonomous vehicle 30. For example, the control unit 11 first acquires an image captured by the shooting unit 26 of the roadside device 20 or an image captured by an outdoor camera from the roadside device 20 or the outdoor camera. The control unit 11 analyzes the image using an arbitrary image analysis technique. The control unit 11 may determine that the autonomous vehicle 30 is present when the pedestrian is reflected toward the position crossing the road, and may determine that the autonomous vehicle 30 is not present when the pedestrian is not reflected. The control unit 11 may acquire position information indicating the position of the autonomous vehicle 30 from the autonomous vehicle 30, and determine whether or not there is an autonomous vehicle 30 that is heading on the basis of the position information.

In S3, the control unit 11 determines whether or not there is at least one following vehicle V of the autonomous vehicle 30. When the following vehicles V do not exist (S3: NO), the operation of the control unit 11 proceeds to S4. When there is at least one following-vehicle V (S3: YES), the operation of the control unit 11 proceeds to S5.

Any method may be employed to determine whether there is at least one following vehicle V. For example, the control unit 11 analyzes an image captured by the roadside device 20 or an outdoor camera using an arbitrary image analysis technique. The control unit 11 may determine that the following vehicle V is present when the following vehicle V of the autonomous vehicle 30 is reflected in the image, and may determine that the following vehicle V is not present when the following vehicle V is not reflected. The control unit 11 acquires positional information indicating respective positions of a plurality of vehicles including the autonomous vehicle 30. The control unit 11 may identify, based on the position information, a vehicle traveling behind the autonomous vehicle 30 within a predetermined distance as the following vehicle V, and determine that the following vehicle V is present. The information indicating the predetermined distance may be set in advance and stored in the storage unit 12. The control unit 11 may identify a plurality of following vehicles V as at least one following vehicle V.

First, in S3, the control unit 11 determines that the following vehicle V of the autonomous vehicle 30 does not exist. In S4, the control unit 11 generates the following vehicle information indicating that the following vehicle does not exist. Thereafter, the process of the control unit 11 proceeds to S6.

Next, in S3, the control unit 11 determines that there is at least one following vehicle V of the autonomous vehicle 30. In S5, the control unit 11 generates the following vehicle information indicating that the following vehicle is present. The following vehicle information may include information about the following vehicle V. For example, the following vehicle information may include information indicating the number of the following vehicles V, the distance from the following vehicle V to the autonomous vehicle 30, and the like. The following vehicle information may include information indicating the speed of the following vehicle V.

Figure 3:
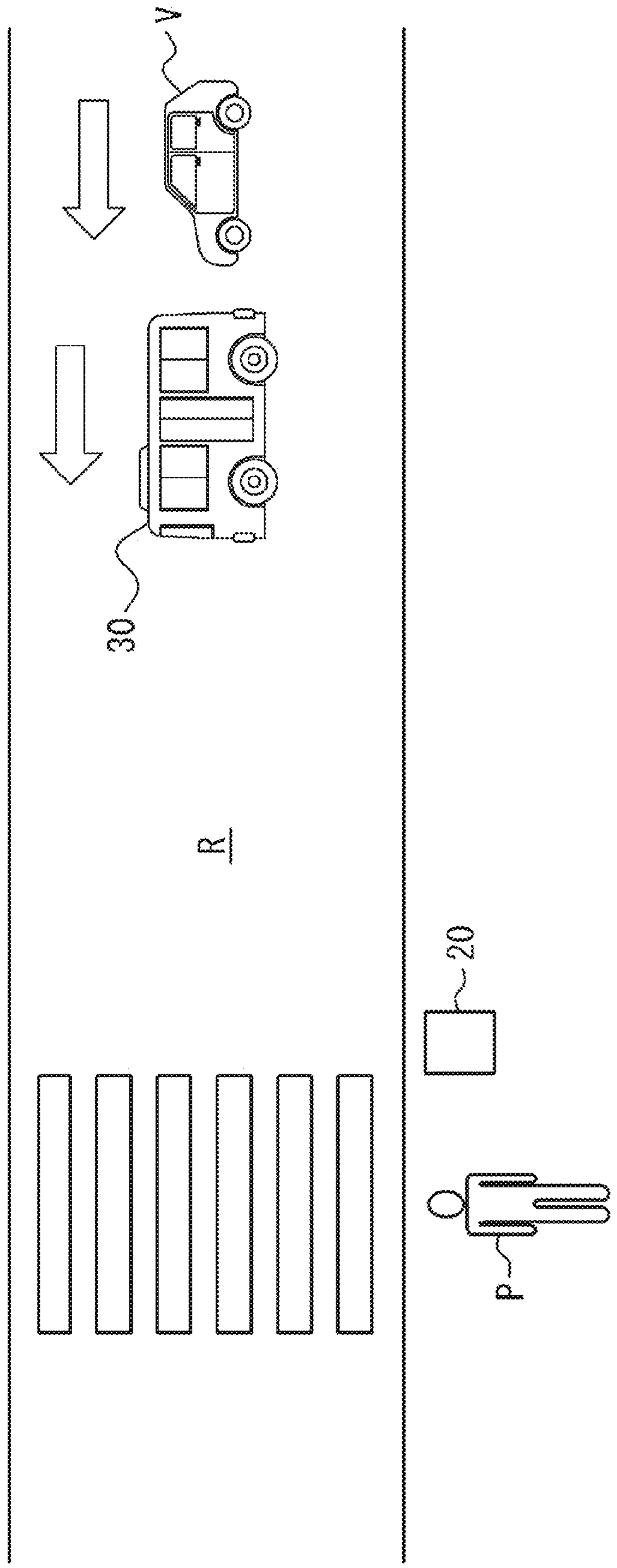
FIG. 3 is a diagram for explaining a positional relationship between an autonomous vehicle and a following vehicle.

FIG. 3 is a diagram illustrating an example of a positional relationship between the autonomous vehicle 30 and the following vehicle V according to the present embodiment. In the example illustrated in FIG. 3, there is an autonomous vehicle 30 traveling on the road R at a position between the pedestrian P and the roadside device 20, and there is one following vehicle V behind the autonomous vehicle 30. In the present example, the control unit 11 determines that the following vehicle V is present, and generates the following vehicle information indicating that the following vehicle is present. In the present example, the following vehicle information includes information indicating that the number of the following vehicles V is one.

In S6 of FIG. 2, the control unit 11 generates approach data including a plurality of items related to the approach of the autonomous vehicles 30. Any method may be employed for generating the approach information. The control unit 11 may generate approach information based on the position information of the autonomous vehicle 30. In the present embodiment, the approach information includes, as items, the arrival of the autonomous vehicle 30, the remaining amount from the autonomous vehicle 30 to the position where the pedestrian crosses the road, and the direction in which the autonomous vehicle 30 comes. The remaining amount specifically includes the “remaining distance” until the autonomous vehicle 30 arrives at the position or the remaining time until the autonomous vehicle 30 arrives at the position. The direction specifically includes a “right direction” or a “left direction” or the like as a front face in a direction in which the pedestrian crosses the road. The direction is not limited to this, and may include “diagonal right front direction,” “diagonal right rear direction,” “diagonal left front direction,” “diagonal left rear direction,” and the like. The direction may include an east-west-north direction, a road name, a road number, or the like. The approach information is not limited to this, and may include any item. For example, the approach information may include, as items, elements for the pedestrian to identify the autonomous vehicle 30, such as the color of the vehicle body of the autonomous vehicle 30.

In the example of FIG. 3, there is an autonomous vehicle 30 that comes from the right direction with the pedestrian's crossing direction as the front. It is assumed that the remaining distance from the autonomous vehicle 30 to the position where the pedestrian traverses the road is 20 m. The control unit 11 generates approach data including "the autonomous vehicle 30 is coming", "20 m" as the remaining distance, and "the right direction" as the direction toward the autonomous vehicle 30 as items.

In S7 of FIG. 2, the control unit 11 transmits the generated approach information and the subsequent-vehicle information to the roadside device 20.

In S8, the control unit 21 of the roadside device 20 acquires the approach information and the following-vehicle information by receiving the approach information and the following-vehicle information from the information processing device 10.

In S9, the control unit 21 determines an item to be notified to the pedestrian from among the items included in the approach information. In the present embodiment, when the following vehicle information indicates that there is at least one following vehicle V, the control unit 21 determines a part of a plurality of items included in the approach information as an item to be notified. In addition, when the following vehicle information indicates that the following vehicle V is not present, the control unit 21 determines the entirety of the plurality of items included in the approach information as the notification item. That is, the control unit 21 determines to notify a part of the plurality of items included in the approach information when there is at least one following vehicle V, and determines to notify all of the plurality of items included in the approach information when there is no following vehicle V.

The control unit 21 may determine an item to be notified to the pedestrian by referring to information specifying an item to be omitted without notification among a plurality of items included in the approach information. The information may be set in advance and stored in the storage unit 22. For example, the control unit 21 refers to the information. The control unit 21 determines two items, i.e., the "arrival of the autonomous vehicle 30" and the "direction", which omit the item "remaining distance" among the three items of "arrival of the autonomous vehicle 30", "remaining distance", and "direction" included in the approach information, as some items to be notified. Accordingly, when the autonomous vehicle 30 prioritizes the flow of traffic on the road and passes without stopping at the position where the pedestrian is located, the pedestrian is notified of an item excluding an item that may become inaccurate information of "remaining distance" among the approach information. Therefore, the probability that the pedestrian makes an erroneous determination is reduced. In addition, it is possible to reduce the possibility that the pedestrian feels troublesome by being notified of inaccurate information.

For example, the control unit 21 may determine, according to the shape of the road, an item in which the above-described item of "remaining distance" and the item of "direction" in which the autonomous vehicle 30 comes to a position where the pedestrian crosses the road are further omitted as a part of the item to be notified to the pedestrian. In this case, when the road has a shape in which the direction in which the autonomous vehicle 30 comes is only one direction, the control unit 21 may determine only "the autonomous vehicle 30 comes" as a part of items to be notified. In a case where the road has a shape in which there are a plurality of directions in which the autonomous vehicle 30 comes, the control unit 21 may determine two items of "the autonomous vehicle 30 comes" and "the direction" as some items to be notified. Thus, when the direction in which the autonomous vehicle 30 comes is clear, the item in which the "direction" is further omitted is notified. Therefore, it is possible to further reduce the possibility of the pedestrian feeling troublesomeness.

For example, the following vehicle information may include a distance between the autonomous vehicle 30 and the following vehicle V. In this case, the control unit 21 may determine, according to the distance, an item in which the item of "direction" is further omitted in addition to the item of "remaining distance" described above, as a part of items to be notified to the pedestrian. Specifically, when the distance between the autonomous vehicle 30 and the following vehicle V is less than the predetermined value, the control unit 21 may determine only the item of "the autonomous vehicle 30 is coming" in which the above-described "remaining distance" and "direction" are omitted as a part of the item to be notified. When the distance is equal to or greater than the predetermined value, the control unit 21 may determine the "arrival of the autonomous vehicle 30" and the "direction" as some items to be notified without the above-described "remaining distance". Thus, when the distance between the autonomous vehicle 30 and the following vehicle V is close and there is a high possibility that the autonomous vehicle 30 passes without stopping at a position crossing the pedestrian, the control unit 21 may determine only the item "the autonomous vehicle 30 is coming" as an item to be notified. The information indicating the predetermined value may be stored in the storage unit 22 in advance. Thus, when the distance between the autonomous vehicle 30 and the following vehicle V is sufficiently separated and there is a high possibility that the autonomous vehicle 30 stops at a position crossing the pedestrian, the control unit 21 can determine both of the items of "the autonomous vehicle 30 comes" and "direction" as the notification item. Therefore, the probability that the pedestrian makes an erroneous determination is reduced. In addition, the possibility that the pedestrian feels troublesome can be reduced.

The control unit 21 may also determine, according to the number of the following vehicles V indicated by the following vehicle information, an item in which the item of "direction" is further omitted in addition to the item of "remaining distance" described above, as a part of items to be notified to the pedestrian. Specifically, when the number of vehicles is equal to or greater than the predetermined value, the control unit 21 may determine only the item "autonomous vehicle 30 is coming" in which the item "direction" is omitted in addition to the item "remaining distance" as an item to be notified as a part. When the distance is less than the predetermined value, the control unit 21 may determine the "autonomous vehicle 30 is coming" and the "direction" as some items to be notified without the above-described "remaining distance". The information indicating the predetermined value may be stored in the storage unit 22 in advance. Accordingly, when there are a number of the following vehicles V equal to or larger than a predetermined value and there is a high possibility that the autonomous vehicle 30 passes without stopping the flow of traffic at a position crossing the pedestrian without stopping the flow of traffic, only the arrival of the autonomous vehicle 30 is notified to the pedestrian. Therefore, the probability that the pedestrian makes an erroneous determination is reduced. In addition, the possibility that the pedestrian feels troublesome can be reduced.

The control unit 11 of the information processing device 10 may determine the item to be notified. In this case, the control unit 11 transmits information indicating the determined item to the roadside device 20.

In S10, the control unit 21 notifies the pedestrian of the items determined by S9 by outputting them via the output unit 25. Any method may be adopted for the notification to the pedestrian. For example, the control unit 21 communicates with a terminal device used by a pedestrian, and transmits information indicating the determined item to the terminal device. When the terminal device displays the information on a display or the like as an output unit, the determined item is notified to the pedestrian. Thereafter, the operation of the system 1 ends.

Figure 4:
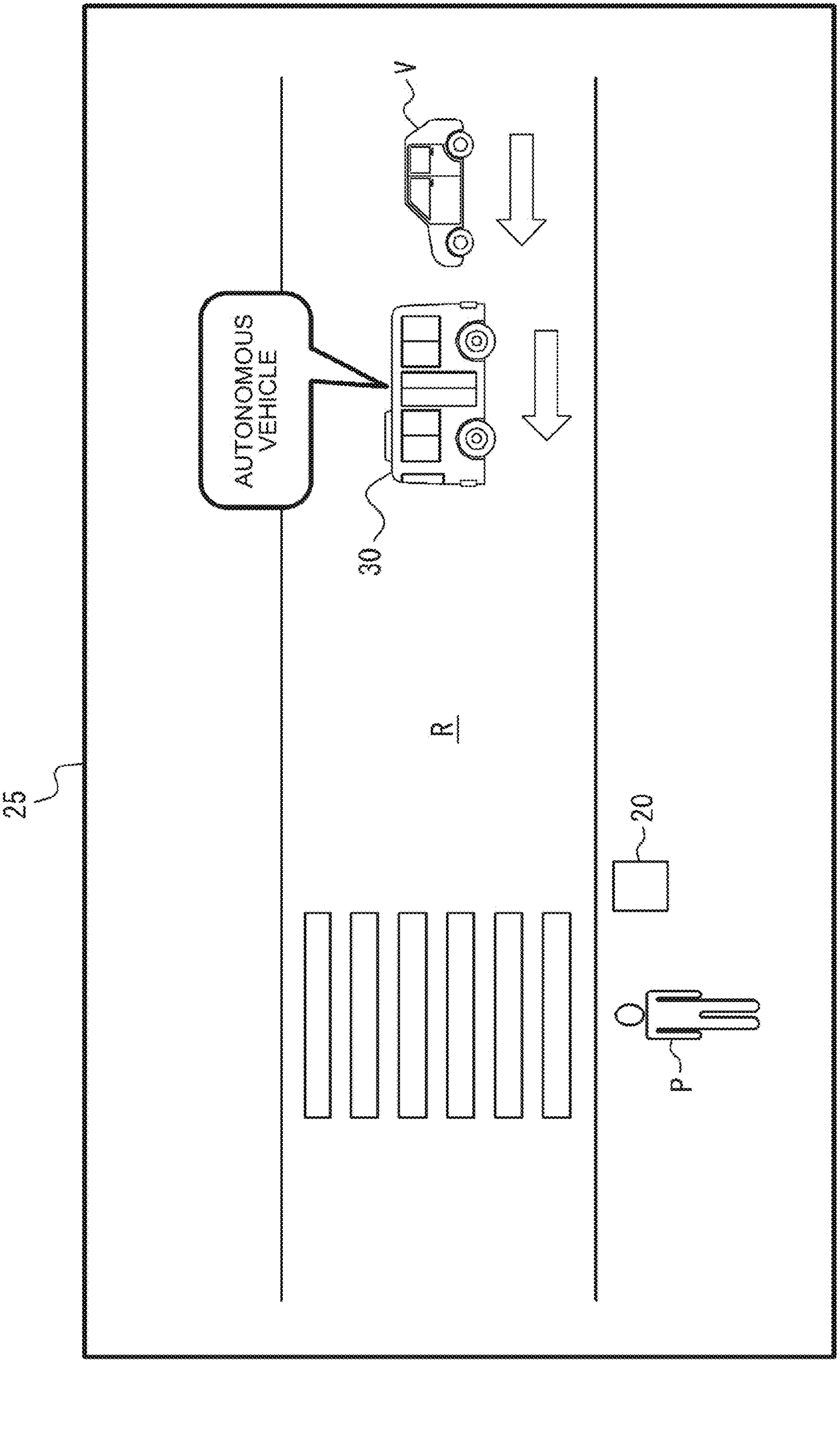
FIG. 4 is an illustration of images displayed on a display of a roadside device.

For example, when the control unit 21 determines that the items "autonomous vehicle 30 is coming" and "Right" are to be notified as part of S9, "autonomous vehicle is coming from the right." A message such as a message is generated and output by voice via a speaker as the output unit 25 to notify the pedestrian. The control unit 21 may notify the pedestrian by displaying the information on a display as the output unit 25. FIG. 4 is an example of an image displayed on the display by the control unit 21. The image shows the autonomous vehicle 30, the following vehicle V, the pedestrian, and the roadside device 20 on a schematic map. In the image, the following vehicle V and the autonomous vehicle 30 travel on the roadside and approach the roadside device 20 and the pedestrian P, and information indicating the autonomous vehicle 30 is displayed in text. The autonomous vehicle 30 may be emphasized by color coding, arrows, blinking, or the like. The image displayed on the display is not limited to the example of FIG. 4, and a text message such as "autonomous vehicle is coming from the right direction" may be displayed.

Figure 5:
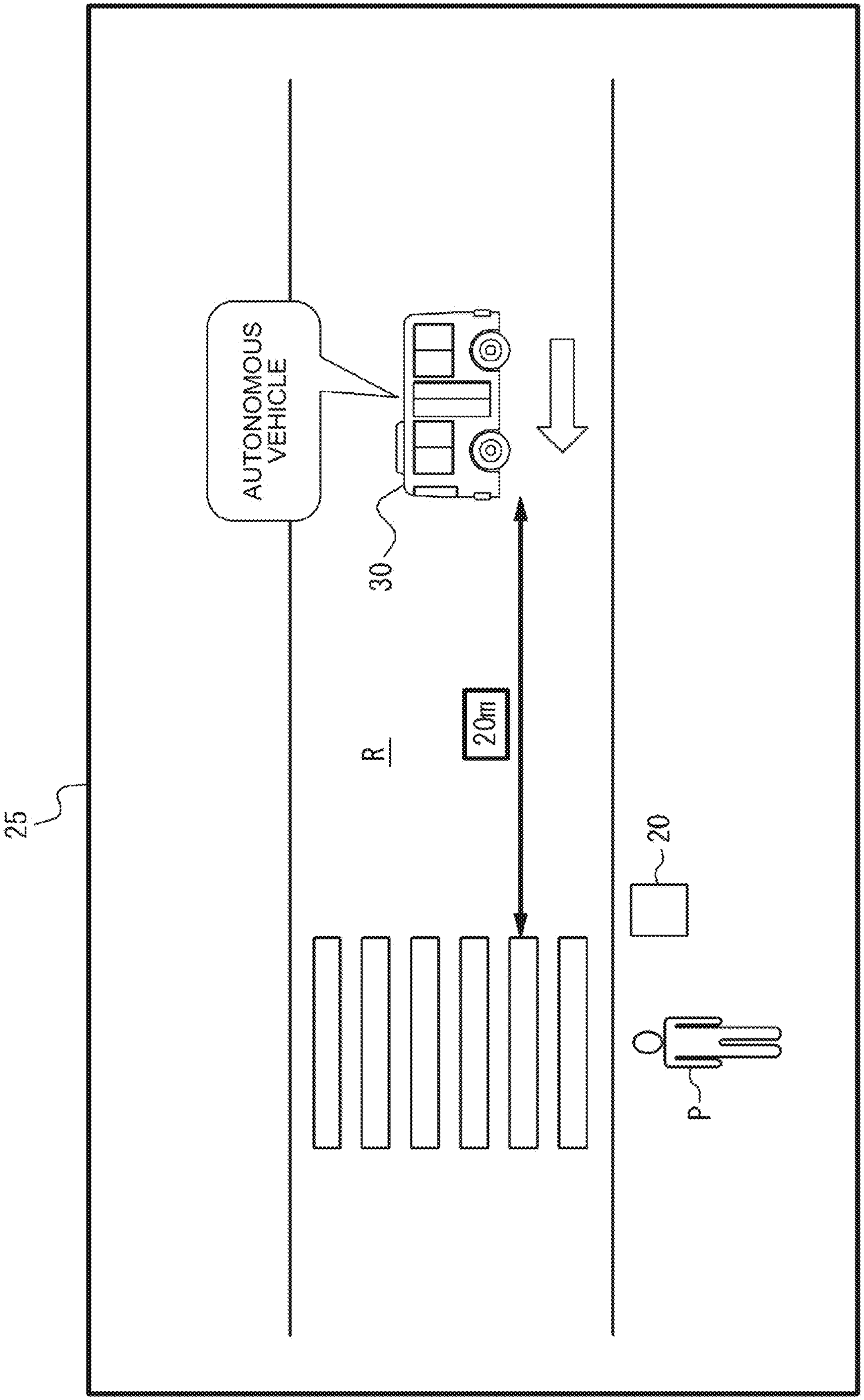
FIG. 5 is an example of an image displayed on a display of a roadside device.

For example, when the control unit 21 determines that all items included in the approach information are to be notified of the "arrival of the autonomous vehicle 30", "rightward direction", and "remaining distance" in S9, the autonomous vehicle comes from the rightward direction. The remaining length is 20 m later. "A message such as a message is generated and output by voice via a speaker as the output unit 25 to notify the pedestrian. The control unit 21 may notify the pedestrian by displaying the information on a display as the output unit 25. FIG. 5 is an example of an image displayed on the display by the control unit 21. The image shows the autonomous vehicle 30, the pedestrian, and the roadside device 20 on a schematic map. In the image, the following vehicle V does not exist, and the autonomous vehicle 30 travels on the roadside and approaches the roadside device 20 and the pedestrian P. In the images, information indicating the autonomous vehicle 30 and "20 m" as the remaining distance of the autonomous vehicle 30 to the roadside device 20 are displayed in texts. If "remaining time" is also determined as a notification item in S9, for example, "20 seconds" as the remaining time may be displayed in the text instead of or in addition to displaying the "20 m" in the text. The autonomous vehicle 30 may be highlighted by color coding, arrows, blinking, etc. The image displayed on the display is not limited to the example shown in FIG. 5, but "autonomous vehicles come from the right. The remaining length is 20 m later." Text messages such as may be displayed.

The present disclosure is not limited to the embodiment described above. For example, two or more blocks shown in the block diagram may be integrated, or a single block may be divided. Instead of executing two or more steps shown in the flowchart in chronological order according to the description, the steps may be executed in parallel or in a different order, depending on the processing capacities of the devices that execute the steps, or as necessary. Other changes may be made without departing from the scope of the present disclosure.

What is claimed is:

1. A roadside device provided at a position where a pedestrian crosses a road, comprising one or more processors configured to:
- receive a first set of information pertaining to an autonomous vehicle approaching the position;
- receive a second set of information pertaining to the autonomous vehicle approaching the position;
- receive trailing information indicating whether there is at least one vehicle following the autonomous vehicle;
- notify the pedestrian of both the first set of information and the second set of information when the trailing information indicates there is no vehicle following the autonomous vehicle; and
- notify the pedestrian of the first set of information when the trailing information indicates there is at least one vehicle following the autonomous vehicle, wherein:
- the pedestrian is not notified of the second set of information when the trailing information indicates there is at least one vehicle following the autonomous vehicle.

2. The roadside device according to claim 1, wherein the second set of information includes a remaining distance to be traveled before the autonomous vehicle arrives at the position.

3. The roadside device according to claim 1, wherein the second set of information includes a remaining time before the autonomous vehicle arrives at the position.

4. The roadside device according to claim 1, wherein the second set of information includes a direction from which the autonomous vehicle comes toward the position.

5. The roadside device according to claim 1, wherein:
- the trailing information includes a following distance between the autonomous vehicle and the following vehicle;
- the one or more processors are further configured to notify the pedestrian of the first set of information when the following distance is less than a predetermined value; and
- the one or more processors are further configured to not notify the pedestrian of the second set of information when the following distance is less than a predetermined value.

6. The roadside device according to claim 1, wherein:
- the trailing information includes a following distance between the autonomous vehicle and the following vehicle; and
- the one or more processors are further configured to notify the pedestrian of both the first set of information and the second set of information when the following distance is equal to or greater than a predetermined value.

7. A roadside device, comprising one or mor processors configured to:
- receive approaching vehicle information about an approaching autonomous vehicle approaching a position where a pedestrian intends to cross a road, the approaching vehicle information including at least two approach information selected from the group consisting of: a position of the approaching autonomous vehicle, an approach direction from which the autonomous vehicle is approaching the position, a current speed of the approaching autonomous vehicle, a remaining distance to be traveled before the approaching autonomous vehicle arrives at the position, and a remaining time before the approaching autonomous vehicle arrives at the position;

receive trailing information indicating whether there is at least one vehicle following the approaching autonomous vehicle; and notify the pedestrian of at least some the approach information included in the received approaching vehicle information, wherein:

the one or more processors are further configured to notify the pedestrian of more of the approach information when the trailing information indicates that there is not at least one vehicle following the approaching autonomous vehicle than the amount of approach information notified when the trailing information indicates that there is at least one vehicle following the approaching autonomous vehicle.

8. The roadside device according to claim 7, wherein, when the trailing information indicates that there is at least one vehicle following the approaching autonomous vehicle, the one or more processors are further configured to not notify the pedestrian of at least one of the approach information selected from the group consisting of: the approach direction from which the autonomous vehicle is approaching the position, the remaining distance to be traveled before the approaching autonomous vehicle arrives at the position, and the remaining time before the approaching autonomous vehicle arrives at the position.

9. The roadside device according to claim 7, wherein, when the trailing information indicates that there is not at least one vehicle following the approaching autonomous vehicle, the one or more processors are further configured to notify the pedestrian of at least one of the approach information selected from the group consisting of: the approach direction from which the autonomous vehicle is approaching the position, the remaining distance to be traveled before the approaching autonomous vehicle arrives at the position, and the remaining time before the approaching autonomous vehicle arrives at the position.

* * * * *